United States Patent [19]

Taga et al.

[11] 4,441,385
[45] Apr. 10, 1984

[54] TRANSMISSION CONTROL SYSTEM WITH POSITIVE LOCKUP CLUTCH DISENGAGING SYSTEM

[75] Inventors: Yutaka Taga; Kazuaki Watanabe; Shinya Nakamura, all of Toyota, Japan

[73] Assignee: Toyota Jidosha Kabushiki Kaisha, Toyota, Japan

[21] Appl. No.: 282,189

[22] Filed: Jul. 10, 1981

[30] Foreign Application Priority Data

Jul. 17, 1980 [JP] Japan .................................. 55-97986

[51] Int. Cl.³ ............................................ B60K 41/16
[52] U.S. Cl. ..................................... 74/867; 192/3.31; 74/732; 74/865
[58] Field of Search ................. 74/869, 868, 867, 865, 74/732; 192/3.32, 3.31, 3.3, 3.29, 3.28, 3.57, 0.033

[56] References Cited

U.S. PATENT DOCUMENTS

| | | | |
|---|---|---|---|
| 4,095,486 | 6/1978 | Ohuuma | 192/3.29 |
| 4,349,088 | 9/1982 | Ito et al. | 192/3.3 |
| 4,367,812 | 1/1983 | Kobayashi et al. | 192/3.3 |

Primary Examiner—Leslie A. Braun
Assistant Examiner—D. Wright
Attorney, Agent, or Firm—Stevens, Davis, Miller & Mosher

[57] ABSTRACT

An automatic transmission includes a gear transmission mechanism including first and second friction mechanisms which are alternatively engaged by alternative supply of first and second pressures thereto when the highest speed stage and the next to highest speed stage are alternatively engaged, and a torque converter including a lockup clutch. A transmission control system includes a pressure control system which controls the gear transmission mechanism by selectively supplying those pressures and possibly others thereto, a lockup clutch control valve which according to its switched position controls the engagement of the lockup clutch and which is switched to its engage position by a control pressure, and a lockup clutch interrupt valve, which selectively transmits the first pressure to the lockup clutch control valve as the control pressure, which is supplied with the second pressure which when present switches it positively to its non communicating condition, and which is also supplied with governor pressure which in the absence of the second pressure switches it to the communicating condition when this governor pressure is higher than a certain value, and otherwise leaves it in the non communicating condition.

2 Claims, 1 Drawing Figure

TRANSMISSION CONTROL SYSTEM WITH POSITIVE LOCKUP CLUTCH DISENGAGING SYSTEM

BACKGROUND OF THE INVENTION

The present invention relates to the field of automatic transmissions; more particularly, relates to the field of automatic transmissions with torque converters which are equipped with lock up clutches; and, yet more particularly, relates to the field of hydraulic fluid pressure control systems for such lock up clutches.

Various automatic transmissions for automotive vehicles are known in various forms. Such an automatic transmission conventionally includes a gear transmission mechanism which provides a plurality of speed stages and which is set to its various speed stages by selective supply of actuating hydraulic fluid pressures to various hydraulic fluid pressure activated friction engaging mechanisms comprised with the gear transmission mechanism such as multi plate clutches and multi plate brakes, said selective supply of actuating hydraulic fluid pressures being provided from a hydraulic fluid pressure control system, of which many forms are well known. Such a hydraulic fluid pressure control system typically requires a supply of line hydraulic fluid pressure for operation, and typically receives this supply of line hydraulic fluid pressure from a hydraulic fluid pressure pump by way of a line pressure regulation valve which modifies the output hydraulic fluid pressure produced by the pump by releasing a part of said output pressure back to a hydraulic fluid reservoir through a release port.

Further, such an automatic transmission conventionally includes a fluid torque converter, which provides a fluid coupling between the engine of the vehicle and the gear transmission mechanism, thus eliminating the need for any clutch system for the drive train of the vehicle, and allowing for the vehicle to be stationary while the engine is turning at a low rotational speed at or close to the idling speed without the engine stalling, as well as providing torque multiplication by fluid flow in a per se well known way when the vehicle is being accelerated at relatively low speed and relatively low engine rotational speed. Many such torque converters are of course presently well known. Generally, such a torque converter comprises: a housing of a generally toroidal shape, on the inside of which there are formed a series of vanes which constitute a pump impeller, and fixed to a power input shaft; a tubrine member mounted within the housing as fixed to a power output shaft; and a stator member mounted within the housing via a one way brake on a fixed member. The housing of such a torque converter is kept filled with hydraulic fluid, which is pumped thereinto and is also drained therefrom as will be more fully explained later, and in a per se well known way the pump impeller, the stator member, and the turbine member cooperate, when the housing of the torque converter is thus filled with hydraulic fluid, to define a toroidal hydraulic fluid flow circulation system, circulation of hydraulic fluid around which in the general circulation fashion of a smoke ring is arranged to transfer torque in a conventional manner between the pump impeller and the turbine member of the torque converter.

This supply of hydraulic fluid for filling the torque converter is typically provided to the inside of the housing thereof via a first channel defined along or beside the central rotational axis thereof—in more detail, via a hole in one of the shafts passing along said central rotational axis or through a space defined between two concentric ones of such shafts; and the draining of hydraulic fluid from the torque converter is also typically performed in a similar manner, through a second such channel. The supply of hydraulic fluid is provided, generally in the art, from a torque converter hydraulic fluid pressure regulation valve which supplies a supply of hydraulic fluid at a regulated torque converter hydraulic fluid pressure, which is generally rather lower than the line hydraulic fluid pressure, to the torque converter.

Further, it has become more and more common nowadays for such a torque converter to be provided with a lock up clutch, i.e. a mechanical clutch which, when actuated, mechanically couples together the pump impeller and the turbine member of the torque converter with regard to their rotation, so that the above mentioned hydraulic torque transmission between the pump impeller and the turbine member no longer occurs or is relevant.

It is well known and conventional for such a lock up clutch to be engaged or disengaged according to the directions of supply and draining of the torque converter hydraulic fluid pressure to and from the interior of the housing of the torque converter. In other words, when the torque converter hydraulic fluid pressure mentioned above is being supplied to one channel which leads to the interior of the torque converter housing, and is being released from another channel, then it is arranged that the lock up clutch is engaged; and when the torque converter hydraulic fluid pressure is being supplied to said other channel, and is being drained from said one channel, then it is arranged that the lock up clutch is disengaged. Thus the supply of torque converter hydraulic fluid pressure to the torque converter from the torque converter pressure regulation valve is used for two purposes: to fill the torque converter with hydraulic fluid; and to selectively engage and disengage the lock up clutch, according to the direction of said supply.

The selective engagement of this lock up clutch is performed by a control device such as a hydraulic fluid pressure control device incorporated in the above mentioned hydraulic fluid pressure control system which controls the engagement of the various gear speed stages of the gear transmission mechanism, according to the operational conditions of the vehicle to which the torque converter incorporating this lock up clutch is fitted. In more detail, generally such a lock up clutch is desirably engaged when the torque converter is required to transmit rotary power at a fairly high rotational speed, at which time the torque conversion function of the torque converter is not substantially required. In such a case, if the lock up clutch is not engaged, then, although the torque converter at this time provides a substantially direct power transmission function between its pump impeller and its turbine member, nevertheless a small amount, such as a few percent, of slippage between the pump impeller and the turbine member will inevitably occur, and this will waste a substantial amount of energy because of the useless churning of hydraulic fluid within the torque converter, and also will cause undesirable heating up of the hydraulic fluid contained within the torque converter. On the other hand, such a lock up clutch is desirably of course, disengaged when the road speed of the automobile is low, or when the rotational speed of the internal combustion engine thereof, i.e. the rotational speed of the pump impeller of the torque converter, is so low as to be close to idling rotational speed, in order to utilize the buffering action of the torque converter at these times, as well as the torque multiplication function thereof. Thus, such a lock up clutch is engaged by the above mentioned hydraulic fluid pressure control device, typically, when and only when the vehicle incorporating the torque converter is being driven at high road speed with the gear transmission mechanism in its highest gear speed stage, with the internal combustion engine of the vehicle thus operating at fairly high rotational speed, in which circumstances the actual hydraulic torque conversion function of the torque converter is not in fact particularly required. The provision of such a lock up clutch is effective for increasing fuel economy of the vehicle, especially when running on the open road such as on an expressway.

A well known prior art construction for such a hydraulic fluid pressure control device for controlling a lock up clutch has comprised (a) a lock up clutch control valve, which is switched between two positions, and which, when in its first switched position, switches said torque converter hydraulic fluid pressure mentioned above so as to supply it to said one channel which leads to the interior of the torque converter housing, and drains said other channel, so as to engage said lock up clutch, and which, when in its second switched position, switches said torque converter hydraulic fluid pressure mentioned above so as to supply it to said other channel, and drains said one channel, so as to disengage said lock up clutch, said lock up clutch control valve being switched to said first switched position thereof by supply of a control hydraulic fluid pressure, and, when said control hydraulic fluid pressure is not supplied, being switched to said second switched position thereof; and (b) a lock up clutch interrupt valve, which is located at an intermediate point of a hydraulic fluid conduit which conducts a supply of hydraulic fluid pressure from a steady hydraulic fluid pressure source, typically the line hydraulic fluid pressure, to the lock up clutch control valve as said control hydraulic fluid pressure. Thus, when the lock up clutch interrupt valve is in a switched state to allow passage of hydraulic fluid pressure therethrough, then the lock up clutch control valve is switched to its said first switched position, and accordingly the lock up clutch is engaged; and, when the lock up clutch interrupt valve is in a switched state to prevent passage of hydraulic fluid pressure therethrough, then the lock up clutch control valve is switched to its said second switched position, and accordingly the lock up clutch is disengaged.

Further, the lock up clutch interrupt valve has typically conventionally been constructed as a spool valve including a spool element, which is axially reciprocated between two switched positions, which is impelled towards its first switched position in which said lock up clutch interrupt valve allows passage of hydraulic fluid pressure therethrough by a supply of the conventionally produced governor hydraulic fluid pressure (which is representative of the road speed of the automobile) to a pressure chamber defined at its one end, and which is impelled towards its second switched position in which said lock up clutch interrupt valve prevents passage of hydraulic fluid pressure therethrough by the compression force of a compression coil spring, said compression force being of course predetermined.

According to such a construction, when the pressure value of the governor hydraulic fluid pressure is less than a predetermined pressure value, i.e. when the automobile road speed is less than a predetermined road speed value, then the force of the compression coil spring prevails over the governor hydraulic fluid pressure in its effect to move said spool element of said lock up clutch interrupt valve, and accordingly said spool element of said lock up clutch interrupt valve is switched to its said second switched position, in which said lock up clutch interrupt valve prevents supply of said source hydraulic fluid pressure to said lock up clutch control valve, and accordingly said lock up clutch control valve is switched to its said second switched position, in which the lock up clutch is disengaged; but, when the pressure value of the governor hydraulic fluid pressure is greater than a predetermined pressure value, i.e. when the automobile road speed is greater than a predetermined road speed value, then the governor hydraulic fluid pressure prevails over the force of the compression coil spring in its effect to move said spool element of said lock up clutch interrupt valve, and accordingly said spool element of said lock up clutch interrupt valve is switched to its first switched position, in which said lock up clutch interrupt valve allows supply of said source hydraulic fluid pressure to said lock up clutch control valve, and accordingly said lock up clutch control valve is switched to its said first switched position, in which the lock up clutch is engaged. Thus, the lock up clutch is engaged or disengaged, according as the vehicle road speed is above or below said predetermined road speed value.

Such a lock up clutch interrupt valve presents no substantial problems as far as concerns its switching action to transit from its said second switched position to its said first switched position, when the vehicle road speed is gradually rising and the force on said spool element of said lock up clutch interrupt value due to said governor hydraulic fluid pressure gradually rises, and in this case the spool element of said lock up clutch interrupt valve is smoothly switched to its said first switched position, substantially as soon as the road speed of said vehicle rises above said predetermined road speed value, and accordingly said lock up clutch is reliably engaged at this time; but, on the other hand, with regard to the switching action of said lock up clutch interrupt valve to transit from its said first position to its said second position, when the vehicle road speed is gradually dropping and the force on said spool element of said lock up clutch due to said governor hydraulic fluid pressure gradually drops, in this case there is a risk, especially after a long period of use of the transmission, or when the hydraulic fluid therein has become rather old and dirty, that said spool element of said lock up clutch interrupt valve may stick in its said first switched position, and not properly transit to its said second switched position, even though the road speed of said vehicle has dropped to substantially below said predetermined road speed value. If such sticking occurs, it is quite possible for the sticking condition to be maintained, even when the vehicle comes to a complete halt; and in this case, of course, since because the lock up clutch remains engaged the slipping function of the torque converter is no longer available, the internal combustion engine of the vehicle will stall.

Further, another problem concerned with the functioning of such a lock up clutch interrupt valve is as follows. Generally the above mentioned predetermined road speed value, at a vehicle road speed above which the lock up clutch is engaged, and at a vehicle road speed below which the lock up clutch is disengaged, will be set so high that the gear transmission mechanism of the automatic transmission of the vehicle will always be in its highest speed stage when the road speed of the vehicle is equal to or greater than said predetermined road speed value. This is because the shifting of the gear transmission mechanism of the automatic transmission between its speed stages, for example between its highest speed stage and its next to highest speed stage, will cause a severe transmission shock, if the lock up clutch is engaged at the time of shifting. In other words, the torque shock cushioning effect of the torque converter is important when the gear transmission mechanism of the automatic transmission changes its speed stage, and accordingly the above mentioned predetermined road speed value is set so high as to ensure that there should be no chance of the gear transmission mechanism shifting between its speed stages while the lock up clutch is engaged. However, in exceptional circumstances the gear transmission mechanism of the automatic transmission may be forced to shift from its highest speed stage to a lower speed stage, at a vehicle road speed higher than the predetermined road speed value; for example, when the driver of the vehicle forces such a shift, by moving the manual transmission shift lever of the vehicle from the "D" range to the "3" range. In such a case, if the lock up clutch is kept engaged, a severe transmission shock is liable to occur. This can produce various undersirable effects, such as shortening the operational life of the friction engaging mechanisms of said transmission as well as the various gears and other parts thereof, and perhaps causing premature failure of the automatic transmission as a whole, as well as damaging the drivability of the vehicle and perhaps even causing a dangerous accident.

SUMMARY OF THE INVENTION

Accordingly, it is the primary object of the present invention to provide a control system for an automatic transmission including a fluid torque converter with a lock up clutch, which can avoid the above described problems.

It is a further object of the present invention to provide a control system for an automatic transmission including a fluid torque converter with a lock up clutch, in the operation of which engagement of the lock up clutch, when the vehicle comes to a complete halt, is positively prevented.

It is a further object of the present invention to provide a control system for an automatic transmission including a fluid torque converter with a lock up clutch, in the operation of which engine stalling is positively prevented.

It is a further object of the present invention to provide a control system for an automatic transmission including a fluid torque converter with a lock up clutch, in the operation of which transmission shock, due to the gear transmission mechanism of the automatic transmission changing between its speed stages while the lock up clutch is engaged, is positively prevented.

It is a further object of the present invention to provide a control system for an automatic transmission including a fluid torque converter with a lock up clutch, which provides good drivability for the vehicle incorporating the transmission.

It is a further object of the present invention to provide a control system for an automatic transmission including a fluid torque converter with a lock up clutch, which does not deteriorate the service life of the automatic transmission.

It is a further object of the present invention to provide a control system for an automatic transmission including a fluid torque converter with a lock up clutch, in which the reliability during use of the automatic transmission is preserved.

It is a further object of the present invention to provide a control system for an automatic transmission including a fluid torque converter with a lock up clutch, in which traffic danger due to sudden transmission shift shock is avoided.

It is a further object of the present invention to provide a control system for an automatic transmission including a fluid torque converter with a lock up clutch, which positively engages the lock up clutch when the vehicle incorporating the automatic transmission is moving at a road speed higher than a certain predetermined road speed, and in addition the gear transmission mechanism of the automatic transmission is shifted to its highest speed stage.

It is a further object of the present invention to provide a control system for an automatic transmission including a fluid torque converter with a lock up clutch, which positively ensures that the lock up clutch is disengaged when vehicle road speed drops to a low value.

It is a further object of the present invention to provide a control system for an automatic transmission including a fluid torque converter with a lock up clutch, which positively ensures that the lock up clutch is disengaged, when the gear transmission mechanism of the automatic transmission shifts from its highest speed stage to its next to highest speed stage.

It is a further object of the present invention to provide a control system for an automatic transmission including a fluid torque converter with a lock up clutch, which positively ensures that the lock up clutch is disengaged, when the gear transmission mechanism of the automatic transmission shifts from its next to highest speed stage to its highest speed stage.

It is a yet further object of the present invention to provide a control system for an automatic transmission including a fluid torque converter with a lock up clutch, which positively ensures that the lock up clutch is disengaged, when the gear transmission mechanism of the automatic transmission is in any speed stage other than its highest speed stage.

It is a yet further object of the present invention to provide a control system for an automatic transmission including a fluid torque converter with a lock up clutch, incorporating such a lock up clutch control valve as described above, in which the supply of switching hydraulic fluid pressure for said lock up clutch control valve is positively interrupted so as to disengage the lock up clutch, when the gear transmission mechanism of the automatic transmission is shifted to any speed stage other than its highest speed stage.

It is a yet further object of the present invention to provide a control system for an automatic transmission including a fluid torque converter with a lock up clutch, incorporating such a lock up clutch interrupt valve as described above, in which it is positively ensured that the valve spool element of the lock up clutch interrupt valve cannot stick in its position to engage the lock up clutch when the vehicle road speed drops to a low road speed value close to zero.

It is a yet further object of the present invention to provide a control system for an automatic transmission including a fluid torque converter with a lock up clutch, incorporating such a lock up clutch interrupt valve as described above, in which any sticking of the valve spool element of the lock up clutch interrupt valve in its position to engage the lock up clutch is positively broken as soon as the vehicle road speed drops to a sufficiently low value.

It is a yet further object of the present invention to provide a control system for an automatic transmission including a fluid torque converter with a lock up clutch, incorporating such a lock up clutch interrupt valve as described above, in which the valve spool member of the lock up clutch interrupt valve is positively biased by hydraulic fluid pressure to its switched position to disengage the lock up clutch, when the gear transmission mechanism of the automatic transmission is in any speed stage other than its highest speed stage, without relying on the resilient force of any spring.

According to the present invention, these and other objects are accomplished by, in an automatic transmission comprising: (a) a gear transmission mechanism, which can provide a plurality of forward speed stages including a highest speed stage and a next to the highest speed stage, and which comprises a plurality of hydraulic fluid pressure activated friction engaging mechanisms combinations of which are selectively actuated by selective supply of hydraulic fluid pressures thereto so as to engage said plurality of speed stages, said plurality of hydraulic fluid pressure activated friction engaging mechanisms including a first friction engaging mechanism which is engaged by supply of a first hydraulic fluid pressure thereto when and only when said gear transmission mechanism is providing its said highest speed stage and a second friction engaging mechanism which is engaged by supply of a second hydraulic fluid pressure thereto when said gear transmission mechanism is providing its said next to highest speed stage but which is not engaged when said gear transmission mechanism is providing its said highest speed stage, said second hydraulic fluid pressure not being present at that time; (b) a torque converter, the interior of which is filled with hydualic fluid, which comprises a lock up clutch and a first and a second hydraulic fluid channel, said lock up clutch being respectively selectively engaged or disengaged, according as to whether hydraulic fluid pressure is supplied to said first hydraulic fluid channel and is released from said second hydraulic fluid channel, or is supplied to said second hydraulic fluid channel and is released from said first hydraulic fluid channel: a transmission control system, comprising: (c) a source of regulated torque converter hydraulic fluid pressure for filling the inside of said torque converter with hydraulic fluid; (d) a hydraulic fluid pressure control system which controls said gear transmission mechanism by said selective supply of said combinations of said hydraulic fluid pressures including said first hydraulic fluid pressure and said second hydraulic fluid pressure thereto so as selectively to engage various ones of said plurality of speed stages, comprising a governor hydraulic fluid pressure control valve which produces a governor hydraulic fluid pressure which is representative of vehicle speed and which increases with increasing vehicle speed; (e) a lock up clutch control valve which has a first switched position and a second switched position, which when in its said first switched position switches said first hydraulic fluid channel so as to supply to it a supply of said torque converter hydraulic fluid pressure and switches said second hydraulic fluid channel so as to release hydraulic fluid therefrom, and which when in its said second switched position switches said second hydraulic fluid channel so as to supply thereto a supply of said torque converter hydraulic fluid pressure and switches said first hydraulic fluid channel so as to release hydraulic fluid therefrom; said lock up clutch control valve being switched to its said first switched position by supply of a control hydraulic fluid pressure thereto, and being otherwise switched to its said second switched position; and (f) a lock up clutch interrupt valve which has a first switched position and a second switched position, which when in its said first switched position switches a supply of said first hydraulic fluid pressure so as to supply said first hydraulic fluid pressure to said lock up clutch control valve as said control hydraulic fluid pressure, and which when in its said second switched position does not switch said supply of said first hydraulic fluid pressure so as to supply said first hydraulic fluid pressure to said lock up clutch control valve as said control hydraulic fluid pressure, so that said lock up clutch control valve in this case is not supplied with any such control hydraulic fluid pressure; said lock up clutch interrupt valve being supplied with said second hydraulic fluid pressure, when it is present, by said hydraulic fluid pressure control system, and when so supplied being positively switched to its said second switched position irrespective of any other control pressures supplied thereto; said lock up clutch interrupt valve further being supplied with said governor hydraulic fluid pressure by said hydraulic fluid pressure control system; and, when said lock up clutch interrupt valve is not supplied with said second hydraulic fluid pressure, said lock up clutch interrupt valve being switched to its said second switched position when the pressure value of said governor hydraulic fluid pressure is less than a critical pressure value, and being switched to its said first switched position when the pressure value of said governor hydraulic fluid pressure is greater than said critical pressure value.

According to such a structure, when said vehicle is running at a road speed over a critical vehicle road speed which corresponds to said critical pressure value of governor hydraulic fluid pressure, and said highest speed stage is being provided by said gear transmission mechanism according to supply of said first hydraulic fluid pressure and non supply of said second hydraulic fluid pressure thereto by said hydraulic fluid pressure control system, said lock up clutch interrupt valve is in its said first switched position, thus said lock up clutch control valve is in its said first position, and consequently said lock up clutch is engaged; but, when vehicle road speed drops to below said critical vehicle road speed, said lock up clutch interrupt valve moves to its said second switched position, and said lock up clutch control valve moves to its said second switched position, said lock up clutch consequently becoming disengaged; and then, even if said lock up clutch interrupt valve at first has stuck in its said first switched position, thus keeping said lock up clutch engaged, if vehicle road speed subsequently drops so far as for said hydraulic fluid pressure control system to cease supply of said first hydraulic fluid pressure and to commence supply of said second hydraulic fluid pressure so as to provide said next to highest speed stage from said gear transmission mechanism, at this time the ceasing of supply of said first hydraulic fluid pressure immediately causes the cessation of supply of said control pressure to said lock up clutch control valve, thus causing said lock up clutch control valve to be switched to its said second position so as to disengage said lock up clutch; and further the supply of said second hydraulic fluid pressure to said lock up clutch interrupt valve positively forces said lock up clutch interrupt valve to its said second switched position by breaking the sticking thereof; according to which operation sticking of said lock up clutch interrupt valve is remedied, engagement of said lock up clutch when said vehicle is operating at a low speed or at rest is positively prevented, and also said lock up clutch is positively ensured to be disengaged whenever said gear transmission mechanism is shifting between its said speed stages; and therefore stalling of said vehicle and transmission shift shock are avoided.

Further, according to a particular aspect of the present invention, these and other objects are more particularly and concretely accomplished by such a transmission control system as described above, wherein said lock up clutch interrupt valve comprises a valve element which has a first position and a second position, and a means for biasing said valve element towards its said second position; said governor hydraulic fluid pressure acting on said valve element so as to bias said valve element towards its said first position; said second hydraulic fluid pressure, when present, acting on said valve element so as positively to bias said valve element to its said second position irrespective of the value of said governor hydraulic fluid pressure; said lock up clutch interrupt valve being further formed with an input port which is supplied with said first hydraulic fluid pressure, when it is present, by said hydraulic fluid pressure control system, and an output port which is communicated with said lock up clutch control valve so that hydraulic fluid pressure present at said output port is supplied to said lock up clutch control valve as said control hydraulic fluid pressure; said input port being communicated to said output port when said valve element is in its said first position; and said input port being put out of communication with said output port when said valve element is in its said second position.

According to a functional specialization of the present invention, these and other objects may be more particularly accomplished by such a transmission control system as described above, wherein, when said lock up clutch interrupt valve is in its said first switched position and said first hydraulic fluid pressure is present and is being supplied to said lock up clutch control valve as said control hydraulic fluid pressure, said first hydraulic fluid pressure modifies said critical hydraulic fluid pressure value so as to decrease it.

A structure that is particularly suitable for accomplishing this function is provided by such a transmission control system as described above, wherein, when said valve element of said lock up clutch interrupt valve is in its said first position and said input port is communicated to said output port and said first hydraulic fluid pressure is present at both said input port and said output port and is being supplied to said lock up clutch control valve as said control hydraulic fluid pressure, said first hydraulic fluid pressure exerts a force on said valve element which biases said valve element towards its said first position; and this can be accomplished by a construction wherein said valve element of said lock up clutch interrupt valve is formed with a first land and a second land with a cutaway portion between said first and said second land; motion of said valve element in the direction from said first land to said second land bringing said valve element to its said first position and motion of said valve element in the direction from said second land to said first land bringing said valve element to its said second position; said cutaway portion, when said valve element is in its said first position, allowing hydraulic fluid communication therethrough between said input port and said output port; and wherein the effective pressure receiving area which said second land presents to hydraulic fluid pressure present in said cutaway portion is larger than is the effective pressure receiving area which said first land presents to said hydraulic fluid pressure.

BRIEF DESCRIPTION OF THE DRAWING

The present invention will now be shown and described with reference to a preferred embodiment thereof, and with reference to the illustrative drawing. It should be clearly understood, however, that the description of the embodiment, and the drawing, are both given purely for the purposes of explanation and exemplification only, and are not intended to be limitative of the scope of the present invention in any way, since the scope of the present invention is to be defined solely by the legitimate and proper scope of the appended claims. In the drawing, the sole FIGURE thereof is a schematic part block diagrammatical part sectional view, showing said preferred embodiment of the automatic transmission control system according to the present invention, with parts thereof which are per se well known in the art and conventional shown as blocks or as diagrammatic line drawings for the convenience of description, and with certain valves shown by longitudinal cross sectional views.

DESCRIPTION OF THE PREFERRED EMBODIMENT

Figure 1:
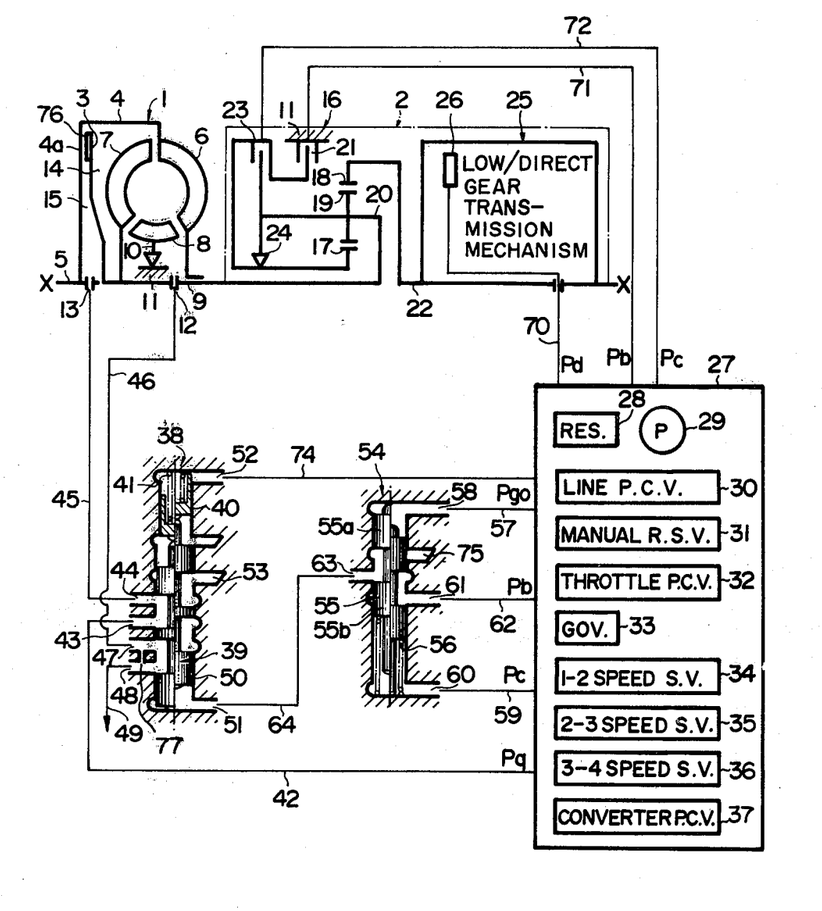

The present invention will now be described with reference to the preferred embodiment thereof, and with reference to the appended drawing, the sole FIGURE of which is a schematic view of an automatic transmission control system according to the present invention. In the FIGURE, the shown automatic transmission comprises a torque converter 1, a gear transmission mechanism 2, and a hydraulic fluid pressure control system.

The torque converter 1 comprises a torque converter system and a lock up clutch assembly. A rotational power input shaft 5, whose central rotational axis is indicated in the FIGURE by the line X—X, receives supply of input rotational power from the crankshaft of an internal combustion engine of the vehicle to which the automatic transmission is fitted, neither the engine nor the crankshaft being shown in the FIGURE, and this power input shaft 5 is rotationally coupled to a housing 4 of the torque converter 1, which rotates integrally with the power input shaft 5, and which has an end wall 4a. A pump impeller 6 formed with vanes thereon is rotationally coupled to a part on the right in the FIGURE of the inside of the torque converter housing 4. Coaxial with the power input shaft 5 there is provided a power output shaft 9 of the torque converter 1, and this power output shaft 9 is rotationally coupled to a turbine member with vanes formed thereon, designated by the reference numeral 7. Thus the rotational axis of this power output shaft 9, also, is the line shown by X—X in the FIGURE. A stator member 8 with vanes formed thereon is mounted, via a one way brake 10, to a fixed member 11 of the torque converter, so as to be rotatable with respect thereto in one preferred rotational direction only, again about the line shown by X—X in the FIGURE. In a per se conventional way, the pump impeller 6, the stator member 8, and the turbine member 7 cooperate, when the housing 4 of the torque converter 1 is filled with hydraulic fluid, to define a toroidal hydraulic fluid flow circulation system, which is adapted to transfer torque in a conventional fashion between the pump impeller 6 and the turbine member 7.

The torque converter 1 is provided with a lock up clutch assembly of a per se well known sort, which will now be explained. To the power output shaft 9 there is coaxially (again about the axial line X—X) fixedly coupled a lock up clutch plate 3, on the left hand side of which in the FIGURE, i.e. on the side closest to the end wall 4a of the torque converter housing 4, there is fixed a lining 76 made of a material adapted to frictionally engage against said end wall 4a of the torque converter housing 4. Accordingly, in combination with said end wall 4a, said clutch plate 3 constitutes a lock up clutch assembly, which, when said clutch plate 3 is impelled towards said end wall 4a, in a manner which will be explained hereinafter, rotationally engages said clutch plate 3 to said torque converter housing 4, i.e. rotationally engages together said power input shaft 5 and said power output shaft 9.

The lock up clutch assembly is engaged and disengaged by the direction of supply of actuating hydraulic fluid pressure thereto, as will now be explained. Two hydraulic fluid ports, a first hydraulic fluid port 12 and a second hydraulic fluid port 13, are provided for conducting hydraulic fluid into and out of the inside of the torque converter housing 4. In fact, these ports 12 and 13 are only schematically shown in the drawing; the practical form of construction therefor, as is per se well known in the art, is for these ports 12 and 13 to open to the inner space within the torque converter housing 5 from within central openings of shafts which extend along the axis of the torque converter, for instance from within central axial holes through the power input shaft 5 and/or the power output shaft 9 of the torque converter 1. The first hydraulic fluid port 12 opens to the part of the space within the torque converter housing 4 which lies to the right of the clutch plate 3 in the FIGURE, and which is designated by the reference numeral 14, and the second hydraulic fluid port 13 opens to the part of the space within the torque converter housing 4 which lies between the end wall 4a of the torque converter housing 4 and the clutch plate 3 in the FIGURE, and which is designated by the reference numeral 15.

Accordingly, when a flow of hydraulic fluid is supplied into the interior space 15 of the torque converter housing 4 which lies between the end wall 4a of the torque converter housing 4 and the clutch plate 3 in the FIGURE in through the second hydraulic fluid port 13, and is taken out of the interior space 14 of the torque converter housing 4 which lies to the right of the clutch plate 3 in the FIGURE from the first hydraulic fluid port 12, this flow of hydraulic fluid of course serving to fill the inside of the torque converter housing 4 with hydraulic fluid as is required for its operation, then the excess of the fluid pressure on the left side in the FIGURE of the clutch plate 3 over the fluid pressure on the right side thereof, due to the rather restricted size of the space available for passage of hydraulic fluid past the lining 76, between said lining 76 and the end wall 4a of the torque converter housing 4, ensures that the clutch plate 3 as a whole is biased to the right in the FIGURE, and does not substantially touch the end wall 4a of the torque converter housing 4, via the lining 76. In this operational state, the clutch plate 3 and the torque converter housing 4 are not substantially mechanically rotationally coupled together, and accordingly the power input shaft 5 and the power output shaft 9 of the torque converter 1 are not mechanically coupled together with regard to their rotation, but instead are only rotationally coupled together via the circulation of hydraulic fluid within the torque converter 1, i.e. are only rotationally coupled together in a torque converting fashion, according to the normal per se well known functioning of the torque converter 1. In other words, the lock up clutch assembly is disengaged, by the supply of hydraulic fluid into the interior space 15 of the torque converter housing 4 in through the second hydraulic fluid port 13, and the taking of hydraulic fluid out of the interior space 14 of the torque converter housing 4 from the first hydraulic fluid port 12.

On the other hand, when a flow of hydraulic fluid is supplied into the interior space 14 of the torque converter housing which lies to the right of the clutch plate 3 in the FIG. 4 in through the first hydraulic fluid port 12, and is taken out of the interior space 15 of the torque converter housing 4 which lies between the end wall 4a of the torque converter housing 4 and the clutch plate 3 in the FIGURE from the second hydraulic fluid port 13, this flow of hydraulic fluid again of course serving to fill the inside of the torque converter housing 4 with hydraulic fluid as is required for its operation, then the excess of the fluid pressure on the right side in the FIGURE of the clutch plate 3 over the fluid pressure on the left side thereof, due to the rather restricted size of the space available for passage of hydraulic fluid past the lining 76, between said lining 76 and the end wall 4a of the torque converter housing 4, ensures that the clutch plate 3 as a whole is biased to the left in the FIGURE, and is pressed tightly against the end wall 4a of the torque converter housing 4, via the lining 76. In this operational state, the clutch plate 3 and the torque converter housing 4 are mechanically rotationally coupled together, and accordingly the power input shaft 5 and the power output shaft 9 of the torque converter 1 are mechanically coupled together with regard to their rotation, and their rotational coupling together by the circulation of hydraulic fluid within the torque converter 1, according to the normal per se well known functioning of the torque converter 1, ceases to be of any importance. In this condition, the circulation of hydraulic fluid within the torque converter 1 soon ceases, and the body of hydraulic fluid within the housing 4 of the torque converter 1, the housing 4, the pump impeller 6, the turbine member 7, and the stator 8 soon rotate together as one unit, at substantially the same rotational speed. In other words, the lock up clutch assembly is engaged, by the supply of hydraulic fluid into the interior space 14 of the torque converter housing 4 in through the first hydraulic fluid port 12, and the taking of hydraulic fluid out of the interior space 15 of the torque converter housing 4 from the second hydraulic fluid port 17. This mode of engaging and disengaging the lock up assembly is per se well known in the art. As will be seen later, the lock up clutch assembly is engaged when the vehicle is running at a road speed higher than a predetermined road speed with the gear transmission mechanism providing its highest speed stage, and is otherwise positively disengaged.

The gear transmission mechanism 2 is only shown as a schematic block in the drawing, because many versions thereof are already well known and conventional. This gear transmission mechanism 2 is made up of an overdrive mechanism 16 and a low/direct gear mechanism 25. The power output shaft 9 of the torque converter 1 also serves as the power input shaft for the overdrive mechanism 16, and the overdrive mechanism 16 has a power output shaft 22 which also serves as the power input shaft for the low/direct gear mechanism 25, said shaft 22, again, being rotatable about its central rotational axis which lies along the line shown by X—X in the FIGURE.

The overdrive mechanism 16 will now be described. This overdrive mechanism 16 comprises an overdrive casing 11. The shaft 9, which serves to transmit rotational power from the torque converter 1 to the overdrive mechanism 16, is connected to a carrier 20 of a planetary gear mechanism of the overdrive mechanism 16, and on the carrier 20 there is rotatably mounted a planetary pinion 19 (of course, in fact, several planetary pinions such as 19 are incorporated in this planetary gear mechanism, but only one of them is schematically shown in the FIGURE), and this planetary pinion 19 rotates in a per se conventional way around a sun gear 17. The outside of the planetary pinion 19 is meshed with a ring gear 18. Between the sun gear 17 and the carrier 20 there are provided, in parallel, a one way clutch 24 for rotationally connecting them together in one direction only, and a multi plate clutch 23 for selectively rotationally connecting them together in both rotational directions; and, further, between the sun gear 17 and the casing 11 of the overdrive mechanism 16 there is provided a multi plate brake 21, for selectively rotationally connecting them together. The multi plate brake 21 and the multi plate clutch 23 are both of them constituted as hydraulic fluid pressure activated friction engaging mechanisms, and are both of them adapted to be selectively engaged and disengaged by selective supply of hydraulic fluid pressures Pb and Pc respectively thereto, via hydraulic fluid conduits 71 and 72 respectively, from the hydraulic fluid pressure transmission control system 27, as will be explained later. The ring gear 18 is connected to the above mentioned shaft 22, which as explained above serves as the power output shaft of the overdrive mechanism 16.

Thus, when actuating hydraulic fluid pressure Pb is supplied from the hydraulic fluid pressure control system 27 via the hydraulic fluid conduit 71 to the multi plate brake 21 of the overdrive mechanism 16, so that the multi plate brake 21 is engaged, and no actuating hydraulic fluid pressure Pc is supplied from the hydraulic fluid pressure control system 27 via the hydraulic fluid conduit 72 to the multi plate clutch 23 of the overdrive mechanism 16, so that the multi plate clutch 23 is disengaged, then the sun gear 17 is rotationally fixed to the housing 11 of the overdrive mechanism 16, while the carrier 20 is free to rotate with respect to the sun gear 17 and the housing 11, and accordingly in a per se well known way the overdrive mechanism 16 operates in its mode of increasing rotational speed, in which its power output shaft 22 rotates at a higher rotational speed than does its power input shaft 9. On the other hand, when no acutating hydraulic fluid pressure Pb is supplied from the hydraulic fluid pressure control system 27 via the hydraulic fluid conduit 71 to the multi plate brake 21 of the overdrive mechanism 16, so that the multi plate brake 21 is disengaged, and actuating hydraulic fluid pressure Pc is supplied from the hydraulic fluid pressure control system 27 via the hydraulic fluid conduit 72 to the multi plate clutch 23 of the overdrive mechanism 16, so that the multi plate clutch 23 is engaged, then the sun gear 17 is rotationally fixed to the carrier 20, while this combination of the sun gear 17 and the carrier 20 is free to rotate with respect to the housing 11 of the overdrive mechanism 16, and accordingly in a per se well known way the overdrive mechanism 16 operates in its mode of providing direct rotational coupling, in which its power output shaft 22 rotates at the same rotational speed as does its power input shaft 9.

Now the low/direct gear transmission mechanism 25 will be described, with regard to its function. The low/direct gear transmission mechanism 25 incorporates several per se well known hydraulic fluid pressure activated friction engagement mechanisms such as multi plate clutches and multi plate brakes, one of which is schematically shown by a block denoted by the reference numeral 26 in the drawing, and, according to selective supply of one or another particular combination of activating hydraulic fluid pressures from the hydraulic fluid pressure control system 27 which will be described later to various combinations of these friction engagement mechanisms such as the friction engagement mechanism 26 via hydraulic fluid conduits such as a hydraulic fluid conduit 70, in a per se well known way the low/direct gear transmission mechanism 25 is controlled to provide one or another of a plurality of different transmission ratios, including a direct speed transmission ratio and various speed reduction ratios, between its power input shaft 22 and its power output shaft, which is not particularly shown in the FIGURE, but which, again, rotates about the axis shown by the line X—X in the FIGURE. The hydraulic fluid pressure activated friction engagement mechanism 26 is selectively supplied with activating hydraulic fluid pressure Pd, or alternatively is relieved of said supply of hydraulic fluid pressure, via the hydraulic fluid conduit 70, and, when the hydraulic fluid pressure activated friction engagement mechanism 26 is so supplied with activating hydraulic fluid pressure Pd, and appropriate combinations of the other hydraulic fluid pressure activated friction engagement mechanisms which are not particularly shown of the low/direct gear transmission mechanism 25 are supplied with activating hydraulic fluid pressures via conduits which are also not shown, then the low/direct gear transmission mechanism 25 is controlled to provide its directly connected speed stage, in which its power output shaft rotates at the same rotational speed as does its power input shaft 22; while, on the other hand, when the hydraulic fluid pressure activated friction engagement mechanism 26 is not supplied with such activating hydraulic fluid pressure Pd, and various other appropriate combinations of the other hydraulic fluid pressure activated friction engagement mechanisms of the low/direct gear transmission mechanism 25 are supplied with activating hydraulic fluid pressures, then the low/direct gear transmission mechanism 25 is controlled to provide various reducing speed stages, in which its power output shaft rotates at a lower rotational speed than does its power input shaft 22.

The above mentioned hydraulic fluid pressure control system 27 is only shown by a block in the drawing, because such hydraulic fluid pressure control systems are already per se well known in various different forms. Further, the various elements of the hydraulic fluid pressure control system 27 are also only shown by blocks in the drawing, because these elements likewise are already per se well known in various different forms. Elements of the hydraulic fluid pressure control system 27 receive supply of pressurized hydraulic fluid, which is picked up from a hydraulic fluid reservoir 28 and is pressurized by a hydraulic fluid pump 29, via a line hydraulic fluid pressure control valve 30, which controls the pressure of this hydraulic fluid to a controlled line hydraulic fluid pressure Pl by releasing a part of this pressurized hydraulic fluid to a relief passage not shown in the FIGURE, which leads back to said hydraulic fluid reservoir 28. Further, the hydraulic fluid pressure control system 27 also comprises a torque converter hydraulic fluid pressure control valve 37, which receives supply of said hydraulic fluid which is being released from the line hydraulic fluid pressure control valve 30, and which controls the pressure of this released hydraulic fluid to a controlled torque converter hydraulic fluid pressure Pq, which is of course lower than the above mentioned line hydraulic fluid pressure Pl. The hydraulic fluid pressure control system 27 may also control the standard value Pl of the line hydraulic fluid pressure and the standard value Pq of the torque converter hydraulic fluid pressure, according to various different operational considerations, but this is not strictly relevant to the present invention.

Further, the hydraulic fluid pressure control system 27 comprises a throttle hydraulic fluid pressure control valve 32 of a per se well known sort, which produces a throttle hydraulic fluid pressure Pth by regulating the line hydraulic fluid pressure Pl produced by the line hydraulic fluid pressure control valve 30 according to the current amount of depression of a throttle pedal of the vehicle incorporating this transmission system, and also comprises a governor hydraulic fluid pressure control valve 33, also of a per se well known sort, which similarly produces a governor hydraulic fluid pressure Pgo by regulating the line hydraulic fluid pressure Pl produced by the line hydraulic fluid pressure control valve 30 according to the current value of the road speed of the vehicle incorporating this transmission system. Yet further, the hydraulic fluid pressure control system 27, as mentioned above, selectively supplies the line hydraulic fluid pressure Pl as actuating hydraulic fluid pressures such as Pb, Pc, and Pd to the various friction engaging mechanisms of the gear transmission mechanism 2, including the multi plate brake 21, the multi plate clutch 23, and the friction engaging mechanism 26, via hydraulic fluid conduits such as the hydraulic fluid conduits 71, 72, and 70 (the others of these friction engaging mechanism and hydraulic fluid conduits not being shown), according to various different operational conditions of the vehicle incorporating this transmission including the range of transmission speeds such as "D" range and "L" range manually selected by the driver of the vehicle on a manual range selection valve 31 and the current values of accelerator pedal depression and vehicle road speed. To this end, as is per se well known in the art, the hydraulic fluid pressure control system 27 switches said supplies Pb, Pc, Pd, etc. of the line hydraulic fluid pressure Pl according to the switching actions of a first/second speed switching valve 34, a second/third speed switching valve 35, and a third/fourth speed switching valve 36, each of said switching valves 34, 35, and 36 comprised in the hydraulic fluid pressure control system 27 being supplied with the above specified throttle hydraulic fluid pressure Pth and governor hydraulic fluid pressure Pgo in such a way that these hydraulic fluid pressures Pth and Pgo oppose one another in their effects thereon, and being switched between its two switched states according to its own particular balance relationship between said throttle hydraulic fluid pressure Pth and said governor hydraulic fluid pressure Pgo. The hydraulic fluid pressure control system 27 also supplies a supply of the torque converter hydraulic fluid pressure Pq to the lock up clutch of the torque converter 1, via a hydraulic fluid conduit 42 and the lock up clutch control valve 38, so as to operate said lock up clutch to be either engaged or disengaged according to the switching position of the lock up clutch control valve 38, as will be explained in detail later. Further, the hydraulic fluid pressure control system 27 supplies various hydraulic fluid pressures for controlling a lock up clutch interrupt valve 54, and for being switched by said lock up clutch interrupt valve 54, via hydraulic fluid conduits 57, 59, and 62, as will also be explained in detail later.

Now the lock up clutch control valve 38 will be described. This lock up clutch control valve 38 comprises a valve housing in which there is formed a bore, and a valve spool member 39 which is slidingly fitted into said bore, so as to reciprocate in the upwards and downwards directions as seen in the drawing. Above said valve spool member 39 in said bore, there is slidingly fitted a piston member 40, the lower end of which in the drawing contacts the upper end of the valve spool member 39. The lower end in the drawing of the valve spool member 39 is formed with a land 50, the diameter of which is substantially larger than the diameter of the piston member 40. Further, a compression coil spring 41 is provided above said piston member 40 in said bore, so as to bias said piston member 40 and said valve spool member 39 downwards as seen in the drawing, and so as to bear on the top end of said bore. At the upper end of said bore as seen in the drawing, above said piston member 40, there is thus defined within said valve bore a first pressure chamber, to which a junior control port 52 communicates, the pressure within this first pressure chamber acting on the combination of the valve spool member 39 and the piston member 40 over an effective pressure receiving area defined by the diameter of the piston member 40 so as to bias them downwards as seen in the drawing; and, at the lower end of said bore as seen in the drawing, below said valve spool member 39, there is defined within said valve bore a second pressure chamber, to which a senior control port 51 communicates, the pressure within this second pressure chamber acting on the combination of the valve spool member 39 and the piston member 40 over an effective pressure receiving area defined by the diameter of the land 50 of the valve spool member 39 so as to bias them upwards as seen in the drawing. The valve spool member 39 and the piston member 40 can move either to downwardly biased positions within the valve bore of the lock up clutch control valve 38, as seen to the left of the central axis of said bore in the drawing, or to upwardly biased positions within said valve bore, as seen to the right of the central axis of said valve bore in the drawing.

The line hydraulic fluid pressure Pl is always supplied, via a hydraulic fluid conduit 74, from the hydraulic fluid pressure control system 27 to the junior port 52 of the lock up clutch control valve 38, and thus to said first pressure chamber at the upper end of the valve bore thereof. Thus, when actuating line hydraulic fluid pressure Pl is also supplied, via the hydraulic fluid conduit 64 as will be explained later, to said second pressure chamber at the bottom of said valve bore to which the senior control port 51 of this lock up clutch control valve 38 communicates, because of the above mentioned substantial difference in the diameters of the land portion 50 of the valve spool member 39 and of the piston member 40, the valve spool member 39 and the piston member 40 are both positively and definitely driven upwards as seen on the right of the central axis of the bore of the direct clutch control valve 38 in the drawing against the biasing action of the compression coil spring 41 which is overcome, and against the force due to said line hydraulic fluid pressure Pl which is as explained above always provided to the first pressure chamber at the top of said valve bore to which the junior control port 52 communicates; but, on the other hand, when no line hydraulic fluid pressure Pl is supplied to the second pressure chamber at the bottom of said valve bore to which the senior control port 51 communicates, then the valve spool member 39 and the piston member 40 are driven downwards as seen on the left of the drawing by the line hydraulic fluid pressure Pl always present in the first pressure chamber at the top of said valve bore to which the junior control port 52 communicates, with the aid of the biasing action of the compression coil spring 41. Thus, it will be seen that sticking of the valve spool member 39 and the piston member 40 of the lock up clutch control valve 38 in either of their switched positions is positively prevented, because the action of the compression coil spring 41 is not relied upon for biasing said valve spool member 39 and said piston member 40; and that said valve spool member 39 and said piston member 40 are moved between their upwardly biased positions and their downwardly biased positions within the valve bore of said lock up clutch control valve 38, according as to whether line hydraulic fluid pressure is or is not supplied to said second pressure chamber defined at the lower end of said valve bore, to which said senior control port 51 communicates.

The lock up clutch control valve 38 is provided with five switched ports 43, 44, 47, 48, and 53. When the valve spool member 39 is in its downwardly biased position within the valve bore as seen on the left of the central axis of the valve bore in the drawing, then the port 53 is not connected to any other port, while the ports 43 and 44 are communicated to one another, and the ports 47 and 48 are also communicated to one another. On the other hand, when the valve spool member 39 is in its upwardly biased position within the valve bore of the lock up clutch control valve 38 as seen on the right of the central axis of the valve bore in the drawing, then the port 48 is not connected to any other port, while the ports 44 and 53 are communicated to one another, and the ports 43 and 47 are also communicated to one another. Further, at all times the ports 47 and 48 are connected, via a restricted orifice 77.

These switching ports of the lock up clutch control valve 38 are connected as follows. The senior control port 51 is connected, via a hydraulic fluid conduit 64, a lock up clutch interrupt valve 54 which will be explained later, and a hydraulic fluid conduit 62, to the hydraulic fluid pressure control system 27, for selectively receiving supply of switching hydraulic fluid pressure Pb for switching the lock up control valve 38, as will be explained in detail in what follows with respect to the operation of this preferred embodiment of the automatic transmission control system according to the present invention. The junior control port 52 is connected, via the hydraulic fluid conduit 74, to the hydraulic fluid pressure control system 27, for always receiving supply of line hydraulic fluid pressure Pl, as explained above. The port 43 is connected, via the hydraulic fluid conduit 42, to the hydraulic fluid pressure control system 27, for receiving supply of the torque converter hydraulic fluid pressure Pq. The port 53 is a drain port for selectively releasing hydraulic fluid from the torque converter 1, as will be explained later. The port 47 is connected, via a hydraulic fluid conduit 46, to the first hydraulic fluid port 12, already mentioned, which leads to the interior space 14 within the torque converter housing 4 which lies to the right of the clutch plate 3 in the FIG. 4. The port 44 is connected, via a hydraulic fluid conduit 45, to the second hydraulic fluid port 13, already mentioned, which leads to the interior space 15 within the torque converter housing 4 which lies between the end wall 4a of the torque converter housing 4 and the clutch plate 3 in the FIGURE, to the left of the clutch plate 13. And the port 48 is connected, via a hydraulic fluid conduit 49, to the input side of a hydraulic fluid cooler, not shown in the drawing, the output side of which is drained to the hydraulic fluid reservoir 28.

Thus, when the lock up clutch assembly is to be activated to be in its locked up state operational condition, then an actuating supply of hydraulic fluid pressure Pb of pressure magnitude substantially equal to the line hydraulic fluid pressure Pl is supplied from the lock up clutch interrupt valve 54, via the hydraulic fluid conduit 64, as will be explained later, to the senior control port 51 of the lock up clutch control valve 38, and this hydraulic fluid pressure present within the second pressure chamber defined at the bottom of the valve bore of said lock up clutch control valve 38 drives the valve spool member 39 and the piston member 40 of the lock up clutch control valve 38 upwards as seen in the drawing to their positions as seen on the right of the central axis of the valve bore in the drawing, against the biasing actions of the compression force of the compression coil spring 41 and of the line hydraulic fluid pressure Pl which is present within the first pressure chamber at the top of the bore of the lock up clutch control valve 38 which are overcome. In this state, further, the hydraulic fluid pressure control system 27 supplies the torque converter hydraulic fluid pressure Pq via the hydraulic fluid conduit 42 to the port 43 of the lock up clutch control valve 38, whence this pressure is transmitted to the port 47 thereof, whence it is transmitted, via the hydraulic fluid conduit 46, to the first hydraulic fluid port 12 of the torque converter housing 4. Hydraulic fluid therefore passes in through this first hydraulic fluid port 12 to the space 14 inside of the torque converter housing 4 to the right in the drawing of the lock up clutch plate 3, fills the inside of the torque converter housing 4 as is of course required, flows past the outer edge of the lock up clutch plate 3, between the lining 76 mounted on this outer edge and the end wall 4a of the torque converter housing 4, to the space 15 inside the torque converter housing 4 to the left in the drawing of the lock up clutch plate 3, and is taken out through the second hydraulic fluid port 13 from the space 15. From this second hydraulic fluid port 13, said hydraulic fluid flow is passed through the conduit 45 to the port 44 of the lock up clutch control valve 38, whence it is transmitted to the port 53 thereof, whence it is drained to the hydraulic fluid reservoir 28.

This flow of hydraulic fluid, as explained above, causes an excess of fluid pressure on the right side in the FIGURE of the clutch plate 3 over the fluid pressure on the left side thereof, due to the rather restricted size of the space available for passage of hydraulic fluid past the lining 76, between said lining 76 and the end wall 4a of the torque converter housing 4, and this pressure difference ensures that the clutch plate 3 as a whole is biased to the left in the FIGURE, and is pressed tightly against the end wall 4a of the torque converter housing 4, via the lining 76, thus causing the clutch plate 3 and the torque converter housing 4 to be mechanically rotationally coupled together. Accordingly the power input shaft 5 and the power output shaft 9 of the torque converter 1 are mechanically coupled together with regard to their rotation, and the lock up clutch assembly is engaged, by the supply of hydraulic fluid into the interior of the torque converter housing 4 in through the first hydraulic fluid port 12, and the taking of hydraulic fluid out of the interior of the torque converter housing 4 from the second hydraulic fluid port 13.

In this state, the port 48 of the lock up clutch control valve 38 is closed by the land portion 50 of the valve spool member 39, and hence only a small flow of hydraulic fluid is passed through the hydraulic fluid cooler, i.e. a small flow of hydraulic fluid which passes through the restricted orifice 77 from the port 47 and hence which bypasses the torque converter 1. However, at this time, since the lock up clutch assembly is engaged, the circulation of hydraulic fluid within the torque converter 1 has ceased, and the body of fluid within the housing 4 of the torque converter 1 is rotating as a unit together with the housing 4, the pump impeller 6, the turbine member 7, and the stator 8, all these being in rotation at substantially the same rotational speed, and accordingly very little heat is being generated within the torque converter 1 by the churning of the hydraulic fluid therein, because little frictional loss is occuring in the torque converter 1. Therefore, only a small cooling effect is necessary to be provided by the hydraulic fluid cooler at this time.

On the other hand, as will be explained later, when the lock up clutch assembly is to be activated to be in its disengaged operational condition, then no actuating supply of hydraulic fluid pressure is supplied from the lock up clutch interrupt valve 54 via the hydraulic fluid conduit 64 to the senior control port 51 of the lock up clutch control valve 38, or to the first pressure chamber defined at the bottom of the valve bore thereof to which said senior control port 51 opens, and thus, because the hydraulic fluid pressure control system 27 still is sending supply of the line hydraulic fluid pressure Pl to the junior control port 52 of the lock up clutch control valve 38, accordingly by the biasing actions of the compression coil spring 41 and of the pressure of this line hydraulic fluid pressure Pl which the hydraulic fluid pressure control system 27 supplies to the second pressure chamber defined at the top of the bore of the lock up clutch control valve 38 in the FIGURE via the junior control port 52, the valve spool member 39 of the lock up clutch control valve 38 and the piston member 40 thereof are shifted downwards as seen in the drawing to their positions as seen on the left of the central axis of the valve bore in the drawing. In this state, again, the hydraulic fluid pressure control system 27 supplies the torque converter hydraulic fluid pressure Pq via the hydraulic fluid conduit 42 to the port 43 of the lock up clutch control valve 38, whence this pressure is transmitted to the port 44 thereof, whence it is now in this case transmitted, via the hydraulic fluid conduit 45, to the second hydraulic fluid port 13 of the torque converter housing 4. Hydraulic fluid therefore passes in through this second hydraulic fluid port 13 to the space 15 inside of the torque converter housing 4 to the left in the drawing of the lock up clutch plate 3, between the lock up clutch plate 3 and the end wall 4a of the torque converter housing 4, fills the inside of the torque converter housing 4 as is of course required, flows past the outer edge of the lock up clutch plate 3, between the lining 76 mounted on this outer edge and the end wall 4a of the torque converter housing 4, to the space 14 inside the torque converter housing 4 to the right in the drawing of the lock up clutch plate 3, and is taken out from the first hydraulic fluid port 12 from this space 14. From this first hydraulic fluid port 12, said hydraulic fluid flow is passed through the conduit 46 to the port 47 of the lock up clutch control valve 38, whence it is communicated to the port 48 thereof, whence it is drained to the hydraulic fluid reservoir 28 via the hydraulic fluid conduit 49 and the hydraulic fluid cooler.

This flow of hydraulic fluid, as explained above, causes an excess of hydraulic fluid pressure on the left side in the FIGURE of the clutch plate 3 over the hydraulic fluid pressure on the right side thereof, due to the rather restricted size of the space available for passage of hydraulic fluid past the lining 76, between said lining 76 and the end wall 4a of the torque converter housing 5, and this pressure difference ensures that the clutch plate 3 as a whole is biased to the right in the FIGURE, and is pressed away from the end wall 4a of the torque converter housing 4, and does not rotationally engage said end wall 4a via the lining 76, thus causing the clutch plate 3 and the torque converter housing 4 not to be mechanically rotationally coupled together. Accordingly the pump impeller 6 and the turbine member 7 of the torque converter 1 are not mechanically coupled together with regard to their rotation, but are only rotationally coupled together via the circulation of hydraulic fluid within the torque converter 1, i.e are only rotationally coupled together in a torque converting fashion, according to the normal per se well known functioning of the torque converter 1. In other words, the lock up clutch assembly is disengaged, by the supply of hydraulic fluid into the interior of the torque converter housing 4 in through the second hydraulic fluid port 13, and the taking of hydraulic fluid out of the interior of the torque converter housing 4 from the first hydraulic port 12.

In this state, the port 47 of the lock up clutch control valve 38 is communicated to the port 48, and flow of hydraulic fluid from the inside of the torque converter 1 is therefore passed through the hydraulic fluid cooler. At this time, since the lock up clutch assembly is disengaged, the circulation of hydraulic fluid within the torque converter 1 is operating to rotationally couple together the pump impeller 6 and the turbine member 7, as explained above, and accordingly the body of hydraulic fluid within the housing 4 of the torque converter 1 is being substantially churned by the pump impeller 6, the turbine member 7, and the stator 8, all these being in rotation at somehwat different rotational speeds, and accordingly considerable heat is being generated within the torque converter 1 by this churning of hydraulic fluid therein, because considerable frictional loss is occurring in the torque converter 1, the actual amount of heat being generated of course being related to the actual rotational speed of the power input shaft 5 and the actual rotational speed of the power output shaft 11 of the torque converter 1, as well as to the load being transmitted. Therefore, a considerable cooling effect may well be necessary from the hydraulic fluid cooler at this time.

Now, the construction of the lock up clutch interrupt valve 54 will be explained. This lock up clutch interrupt valve 54 comprises a valve housing in which there is formed a bore, and a valve spool member 55 which is slidingly fitted into said bore, so as to reciprocate in the upwards and downwards directions as seen in the drawing. The upper end in the drawing of the valve spool member 55 is formed with an upper land 55a, and the lower end in the drawing of the valve spool member 55 is formed with a lower land 55b, the diameter of which is somewhat larger than the diameter of the upper land 55a. Further, a compression coil spring 56 is provided below said valve spool member 55 in said bore, so as to bias said valve spool member 55 upwards as seen in the drawing, and so as to bear on the lower end of said bore of said lock up clutch interrupt valve 54. At the upper end of said bore as seen in the drawing, above said valve spool member 55, there is thus defined within said valve bore a first pressure chamber to which a first control port 58 communicates, the pressure within this first pressure chamber acting on the valve spool member 55 over an effective pressure receiving area defined by the diameter of the upper land 55a of said valve spool member 55, so as to bias said valve spool member 55 downwards as seen in the drawing within said valve bore; and at the lower end of said bore of said lock up clutch interrupt valve 54 as seen in the drawing, below said valve spool member 55, there is defined within said valve bore a second pressure chamber to which a second control port 60 communicates, the pressure within this second pressure chamber acting on the valve spool member 55 over an effective pressure receiving area defined by the diameter of the lower land 55b of the valve spool member 55, so as to bias said valve spool member 55 upwards as seen in the drawing within said valve bore. The valve spool member 55 can move either to a downwardly biased position within said valve bore of said lock up clutch interrupt valve 54, as seen to the right of the central axis of the bore of the lock up clutch interrupt valve 54 in the drawing, or to a upwardly biased position within said valve bore, as seen to the left of the central axis of the valve bore in the drawing.

The governor hydraulic fluid pressure Pgo produced by the governor hydraulic fluid pressure control valve 33 is always supplied, via a hydraulic fluid conduit 57, from the hydraulic fluid pressure control system 27 to the first control port 58 of the lock up clutch interrupt valve 54, and thus to said first pressure chamber defined at the upper end of the valve bore thereof. Further, the hydraulic fluid pressure Pc, which is produced as explained above by the hydraulic fluid pressure control system 27 for engaging the multi plate clutch 23 of the overdrive mechanism 16 of the gear transmission mechanism 2 when and only when the gear transmission mechanism 2 as a whole is to be controlled not to be in its highest speed stage, i.e. not to be in the overdrive speed stage, and which when so produced is of a pressure magnitude substantially equal to the line hydraulic fluid pressure Pl, is supplied, via the hydraulic fluid conduit 59, to the second control port 60 of the lock up clutch interrupt valve 54, and thus to said second pressure chamber defined at the lower end of the valve bore thereof.

Thus, when the gear transmission mechanism 2 is being controlled by the hydraulic fluid pressure control system 27 not to be in its overdrive speed stage, then the hydraulic fluid pressure Pc, of magnitude equal to the line hydraulic fluid pressure Pl, which is supplied to said second pressure chamber at the lower end of the valve bore of the lock up clutch interrupt valve 54, with the aid of the biasing action of the compression coil spring 56, positively biases the valve spool member 55 thereof to its upward position within said valve bore, as seen in the part of the drawing to the left of the central axis of said valve bore, irrespective of what may be the current value of the governor hydraulic fluid pressure Pgo which is present in said first pressure chamber at the upper end of said valve bore, since the force due to this governor hydraulic fluid pressure Pgo is always easily overcome by the combination of the force due to the pressure in said second pressure chamber and the force due to said compression coil spring 56.

On the other hand, when the gear transmission merchanism 2 is being controlled by the hydraulic fluid pressure control system 27 to be in its highest speed stage or the overdrive speed stage, then the hydraulic fluid pressure Pc is not being supplied to the multi plate clutch 23 of the overdrive mechanism 16 of said gear transmission mechanism 2, because the hydraulic fluid pressure Pb is being supplied to the multi plate brake 21 thereof instead, and therefore no hydraulic fluid pressure is present in said second pressure chamber at the lower end of the valve bore of the lock up clutch interrupt valve 54. In this case, the force due to the governor hydraulic fluid pressure Pgo which is being supplied to the first pressure chamber defined at the upper end of the valve bore of the lock up clutch interrupt valve 54 in the drawing acts upon the valve spool member 55 thereof so as to bias said valve spool member 55 downwards in the drawing, against the biasing action of the compression coil spring 56 which opposes said force due to the governor hydraulic fluid pressure Pgo, and thus said valve spool member 55 is moved upwards and downwards in the drawing, according to a balance relationship between the force due to said governor hydraulic fluid pressure Pgo and the compression action of said compression coil spring 56; in more detail, when the force due to said governor hydraulic fluid pressure Pgo prevails over the force due to said compression coil spring 56, which will occur when said governor hydraulic fluid pressure Pgo is at a higher pressure value than a certain predetermined pressure value, i.e. the road speed of the vehicle incorporating this transmission system is higher than a certain predetermined speed, then said valve spool member 55 is shifted to its downward shifted position as seen to the right of the central axis of the valve bore of the lock up clutch interrupt valve 54 in the drawing; and, when the force due to said compression coil spring 56 prevails over the force due to said governor hydraulic fluid pressure Pgo, which will occur when said governor hydraulic fluid pressure Pgo is at a lower pressure value than said certain predetermined pressure value, i.e. the road speed of the vehicle incorporating this transmission system is lwoer than said certain predetermined speed, then said valve spool member 55 is shifted to its upward shifted position as seen to the left of the central axis of the valve bore of the lock up clutch interrupt valve 54 in the drawing.

The lock up clutch interrupt valve 54 is provided with three switched ports 61, 63, and 75. The port 75 is a drain port; the port 63 is connected to the hydraulic fluid conduit 64 which, as explained above, leads to the senior control port 51 of the lock up clutch control valve 38; and the port 61 is connected, via a hydraulic fluid conduit 62, to the hydraulic fluid pressure control system 27, and is supplied with the hydraulic fluid pressure Pb, which is produced as explained above by the hydraulic fluid pressure control system 27 for operating the multi plate brake 21 of the overdrive mechanism 16 when and only when the gear transmission mechanism 2 as a whole is to be controlled to be in its highest speed stage or the overdrive speed stage, and which when so produced is of a pressure magnitude substantially equal to the line hydraulic fluid pressure Pl. When the valve spool member 55 of the lock up clutch interrupt valve 54 is in its upwardly biased position within the valve bore thereof as seen to the left of the valve bore of the lock up clutch interrupt valve 54 in the drawing, then the port 61 is not communicated to any other port, while the port 63 is communicated to the drain port 75. On the other hand, when the valve spool member 55 of the lock up clutch interrupt valve 54 is in its downwardly biased position within the valve bore thereof as seen to the right of said valve bore in the drawing, then the drain port 75 is not communicated to any other port, while the port 63 is communicated to the port 61.

The lock up clutch control system described above operates as follows.

First, when the gear transmission mechanism 2 of the automatic transmission is being controlled by the hydraulic fluid pressure control system 27 to be in its highest speed stage, i.e. in the overdrive speed stage, in other words, when the hydraulic fluid pressure Pb is being supplied to the multi plate brake 21 of the overdrive mechanism 16 via the hydraulic fluid conduit 71, but the hydraulic fluid pressure Pc is not being supplied to the multi plate clutch 23 of the overdrive mechanism 16 via the hydraulic fluid conduit 72, then in a fashion similar to the operation of the prior art system explained in the section of this specification entitled "BACKGROUND OF THE INVENTION" the valve spool member 55 of the lock up clutch interrupt valve 54 is shifted to and fro between its upwardly biased position as seen on the left of the central axis of the bore of the lock up clutch interrupt valve 54 in the FIGURE and its downwardly biased position as seen on the right of said central axis of said valve bore in the FIGURE, according to the aforesaid balance relationship between the force due to the governor hydraulic fluid pressure Pgo and the compression action of the compression coil spring 56; i.e., when the road speed of the vehicle incorporating this transmission system is higher than said certain predetermined speed then the valve spool member 55 is shifted to its downwardly biased position, while when the road speed of the vehicle incorporating this transmission system is lower than said certain predetermined speed then said valve spool member 55 is shifted to its upwardly biased position. This upwards and downwards shifting is allowed at this time because there is no hydraulic fluid pressure Pc being supplied to the second pressure chamber defined at the bottom of the bore of the lock up clutch interrupt valve 54 as seen in the drawing, because no such hydraulic fluid pressure Pc is being supplied at this time to the multi plate clutch 23. When the valve spool member 55 is thus shifted to its upward shifted position within the bore of the lock up clutch interrupt valve 54 as seen on the left of the central axis of the lock up clutch interrupt valve 54 in the drawing, then the supply of the hydraulic fluid pressure Pb to the port 61 of said lock up clutch interrupt valve 54 (which is currently being made, since said hydraulic fluid pressure Pb is currently being supplied to the multi plate brake 21 of the overdrive mechanism 16 by the hydraulic fluid pressure control system 27, in order to put said overdrive mechanism 16 into the overdrive speed stage) is interrupted there and is not communicated to the port 63 thereof, and accordingly no supply of hydraulic fluid pressure is communicated to the senior control port 51 of the lock up clutch control valve 38, which is instead communicated via the hydraulic fluid conduit 64 and the lock up clutch interrupt valve 54 to the drain port 75, and accordingly the valve member 39 of this lock up clutch control valve 38 is in its downwardly biased position within the valve bore thereof as seen on the left of the central axis of said valve bore in the FIGURE, and as explained above in this condition the lock up clutch assembly of the torque converter 1 is disengaged; while, on the other hand, when the valve spool member 55 of the lock up clutch interrupt valve 54 is shifted to its downward shifted position within the valve bore as seen on the right of the central axis of said lock up clutch interrupt valve 54 in the drawing, then the supply of the hydraulic fluid pressure Pb which is currently being made by the hydraulic fluid pressure control system 27 via the hydraulic fluid conduit 62 to the port 61 of said lock up clutch interrupt valve 54 is communicated to the port 63 thereof, and accordingly said supply of hydraulic fluid pressure Pb, of pressure value substantially equal to line hydraulic fluid pressure Pl, is communicated to the senior control port 51 of the lock up clutch control valve 38, and accordingly the valve member 39 of this lock up clutch control valve 38 is in its upwardly biased position within the valve bore thereof as seen on the right of the central axis of said valve bore in the FIGURE, and as explained above in this condition the lock up clutch assembly of the torque converter 1 is engaged.

Now suppose that the automatic transmission is in its operational condition in which the gear transmission mechanism 2 of the automatic transmission is being controlled by the hydraulic fluid pressure control system 27 to be in its highest speed stage, i.e. in the overdrive speed stage, and further the vehicle road speed is higher than said predetermined road speed value, so that as explained above the valve spool member 55 of the lock up clutch interrupt valve 54 is in its downwardly shifted position within the bore of said lock up clutch interupt valve 54 as seen in the FIGURE by the biasing action of the governor hydraulic fluid pressure Pgo supplied to the first pressure chamber at the top of the lock up clutch interrupt valve 54 and the lock up clutch is thereby engaged. Suppose that now the hydraulic fluid pressure control system 27 decides that the gear transmission mechanism 2 should be shifted to its next speed stage below its highest speed stage, by the accelerator pedal of the vehicle being very much depressed, thus causing the throttle of the internal combustion engine thereof to be very wide open and causing the throttle hydraulic fluid pressure Pth to be very high, thus biasing the third/fourth switching valve 36 to its position to engage the third speed. In this case, first of all the hydraulic fluid pressure control system 27 ceases to supply the hydraulic fluid pressure Pb to the multi plate brake 21, and instead starts to supply the hydraulic fluid pressure Pc to the multi plate clutch 23. As soon as the hydraulic fluid pressure Pb ceases to be provided, the hydraulic fluid pressure supplied to the port 61 of the lock up clutch interrupt valve 54 is no longer present, and accordingly the supply of hydraulic fluid pressure to the senior control port 51 of the lock up clutch control valve 38 immediately ceases, regardless of the value of the governor hydraulic fluid pressure acting at the upper end of the lock up clutch interrupt valve 54, and the valve spool member 39 thereof is as explained above positively moved within the valve bore thereof from its upwardly biased position to its downwardly biased position, thus disengaging the lock up clutch assembly of the torque converter 1 as explained above without any delay, even before the lock up clutch interrupt valve 54 is switched over from its hydraulic fluid pressure communicating state to its non communicating state.

In fact, the overdrive mechanism 16 of the gear transmission mechanism 2 of course takes a little time to shift over from its speed increasing operational mode to its direct connection operational mode, due to the time lags inherent in the operation of the multi plate clutch 23 and in the operation of the multi plate brake 21, and accordingly, by the time that the gear transmission mechanism 2 actually shifts down from its highest speed stage to its next to highest speed stage, the lock up clutch of the torque converter 1 will already have been disengaged as explained above, thus minimizing transmission shift torque shock due to the shifting, and accordingly avoiding snatching during the engagement of said multi plate clutch 23, as well as avoiding sudden stresses being put upon the various other components of the gear transmission mechanism 2 such as gears and bearings comprised therein. Thereby, the operating lifespan of the automatic transmission as a whole is lengthened, and also it is rendered to be more reliable. Further, the possibly dangerous deterioration of driving feeling of the vehicle caused by such transmission shift shock is positively avoided. This beneficial effect is attained, as explained above, according to the operation of the shown transmission control system according to the preferred embodiment of the present invention, basically because the source of hydraulic fluid pressure which is switched by the lock up clutch interrupt valve 54 and is supplied as a switching hydraulic fluid pressure to the lock up clutch control valve 38 is not the line hydraulic fluid pressure Pl, as has been the case in the prior art, but is instead the hydraulic fluid pressure Pb which is also selectively supplied as an actuating fluid pressure to the one of the hydraulic fluid pressure activated friction engaging mechanisms (i.e. the multi plate brake 21) of the gear transmission mechanism 2 which is engaged when and only when the highest speed stage of said gear transmission mechanism 2 is being provided.

Of course, shortly after the above described disengagement of the lock up clutch, the supply of the hydraulic fluid pressure Pc to the pressure chamber defined at the bottom of the valve bore of the lock up clutch interrupt valve 54 positively biases the valve spool member 55 of this valve, as explained above, to its upwardly biased position as seen to the left of the central axis of said valve bore in the FIGURE, irrespective of the current values of the vehicle road speed and of the governor hydraulic fluid pressure Pgo. This positive positioning of the valve spool member 55 to its switched position which interrupts communication between the ports 61 and 63 of the lock up clutch interrupt valve 54 ensures that, when later the hydraulic fluid pressure control system 27 decides that the gear transmission mechanism 2 should be shifted back to its highest speed stage, i.e. the overdrive speed stage, at this time the lock up clutch interrupt valve 54 is positioned to its non pressure communicating switched condition, and accordingly the lock up clutch assembly of the torque converter 1 remains disengaged for a short time, even after termination of the supply of the hydraulic fluid pressure Pc to the multi plate clutch 23 and commencement of the supply of the hydraulic fluid pressure Pb to the multi plate brake 21, while the lock up clutch interrupt valve 54 switches back to its pressure communicating switched condition. Thus, it is ensured that the lock up clutch assembly of the torque converter 1 remains disengaged during the shifting of the gear transmission mechanism from its next to highest speed stage back up to its highest speed stage.

On the other hand, suppose that the gear transmission mechanism 2 of the automatic transmission is in its operational condition in which it is being controlled by the hydraulic fluid pressure control system 27 to be in its highest speed stage, i.e. in the overdrive speed stage, and further that the vehicle road speed is higher than said predetermined value, so that as explained above the valve spool member 55 of the lock up clutch interrupt valve 54 is in its downwardly shifted position within the bore of said lock up clutch interrupt valve as seen on the right side of the central axis of said valve bore in the FIGURE and the lock up clutch is thereby engaged. Now suppose that from this condition the vehicle road speed gradually drops, so that the governor hydraulic fluid pressure Pgo drops down to and below the value thereof at which the force exerted by said governor hydraulic fluid pressure Pgo on the valve spool member 55 of the lock up clutch interrupt valve 54 in the downwards direction as seen in the drawing becomes equal to the spring force exerted on said valve spool member 55 in the upwards direction in the drawing by the compression coil spring 56, so that the valve spool member 55 outght in principle to shift from its downwardly biased position to its upwardly biased position. Further, suppose that undesirably, perhaps due to dirt or the like within the valve bore of the lock up clutch interrupt valve 54, or to wear thereof or of the valve spool member 55, in fact the valve spool member 55 does not so shift, i.e. that the valve spool member 55 sticks within its valve bore. This may happen, especially if the compression coil spring 56 has become somewhat weak with age and use. In such a case, of course, the lock up clutch assembly of the torque converter 1 does not become disengaged, even as vehicle road speed drops. Now, in the prior art explained earlier, if the vehicle road speed were to drop to zero, so that the vehicle came to a complete halt, then the continued engagement of the lock up clutch caused that the internal combustion engine of the vehicle to stall, which was most undesirable. However, according to the operation of the shown transmission control system according to the preferred embodiment of the present invention, if the vehicle road speed continues to drop below the above mentioned predetermined road speed value at which the lock up clutch should become disengaged but does not do so, as a matter of course at some second lower value of vehicle road speed the hydraulic fluid pressure control system 27 decides that the gear transmission mechanism 2 should be shifted down from its highest speed stage to its next to highest speed stage. At this time, therefore, the hydraulic fluid pressure control system 27 switches over the supply of the hydraulic fluid pressures Pb and Pc; i.e., the hydraulic fluid pressure control system 27 ceases to supply the hydraulic fluid pressure Pb to the multi plate brake 21 of the overdrive mechanism 16 of the gear transmission mechanism 2, and instead starts to supply the hydraulic fluid pressure Pc to the multi plate clutch 23 of said overdrive mechanism 16, in order to shift over the overdrive mechanism 16 from its speed increasing operational mode to its directly connected operational mode. As explained above, in the same way as previously, the termination of the supply of the hydraulic fluid pressure Pb via the conduit 62, the ports 61 and 63 of the lock up clutch interrupt valve 54, and the conduit 64 to the senior control port 51 of the lock up clutch control valve 38 causes the lock up clutch assembly of the torque converter 1 to become disengaged and thus ensures that the internal combustion engine of the vehicle cannot stall, even when the vehicle comes to a complete halt; and further, because according to the construction of the shown transmission control system according to the preferred embodiment of the present invention the hydraulic fluid pressure Pc is now supplied to the second pressure chamber defined at the bottom of the bore of the lock up clutch interrupt valve 54 as seen in the FIGURE, the pressure in this second pressure chamber positively biases the valve spool member 55 of this lock up clutch interrupt valve 54 upwards within the valve bore thereof as seen in the drawing, with the aid of the force due to the compression coil spring 56, and this strong upward force exerted on the valve spool member 55 positively ensures that any sticking of this valve spool member 55 in its downwardly biased position within the valve bore will be broken and overcome. Thereby, when the vehicle speed later increases, the lock up clutch interrupt valve 54 will operate properly, because its sticking has been unseized.

The reason for the lower land portion 55b as seen in the drawing of the valve spool member 55 of the lock up clutch interrupt valve 54 to be made somewhat larger in diameter than the upper land portion 55a thereof is to give a hysteresis to the above described balance relationship between the force due to the governor hydraulic fluid pressure Pgo and the compression action of the compression coil spring 56, because when the hydraulic fluid pressure Pb is being communicated from the port 61 to the port 60 of the lock up clutch interrupt valve 54 this hydraulic fluid pressure Pb exerts a certain force in the downwards direction in the FIGURE on the valve spool member 55, according in the difference in the pressure receiving areas of the lower and upper lands 55b and 55a of this valve spool member 55. Thereby, the operation for engagement and disengagement of the lock up clutch is stabilized, and hunting of this lock up clutch, i.e. repeated engagement and disengagement thereof as the vehicle road speed slightly varies, is positively prevented.

Although the present invention has been shown and described with reference to a preferred embodiment thereof, and in terms of the illustrative drawing, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawing, but solely by the scope of the appended claims, which follow.

What is claimed is:

1. In an automatic transmission comprising:
   (a) a gear transmission mechanism, which can provide a plurality of forward speed stages including a highest speed stage and a next to highest speed stage, and which comprises a plurality of hydraulic fluid pressure activated friction engaging mechanisms combinations of which are selectively actuated by selective supply of hydraulic fluid pressures thereto so as to engage said plurality of speed stages, said plurality of hydraulic fluid pressure activated friction engaging mechanisms including a first hydraulic fluid pressure thereto when and only when said gear transmission mechanism is providing its said highest speed stage and a second friction engaging mechanism which is engaged by supply of a second hydraulic fluid pressure thereto when said gear transmission mechanism is providing its said next to highest speed stage but which is not engaged when said gear transmission mechanism is providing its said highest speed stage, said second hydraulic fluid pressure not being present at that time;
   (b) a torque converter, the interior of which is filled with hydraulic fluid, which comprises a lock up clutch and a first and a second hydraulic fluid channel, said lock up clutch being respectively selectively engaged or disengaged, according as to whether hydraulic fluid pressure is supplied to said first hydraulic fluid channel and is released from said second hydraulic fluid channel, or is supplied to said second hydraulic fluid channel and is released from said first hydraulic fluid channel: a transmission control system, comprising:
   (c) a source of regulated torque converter hydraulic fluid pressure for filling the inside of said torque converter with hydraulic fluid;
   (d) a hydraulic fluid pressure control system which controls said gear transmission mechanism by said selective supply of said combinations of said hydraulic fluid pressures including said first hydraulic fluid pressure and said second hydraulic fluid pressure thereto so as selectively to engage various ones of said plurality of speed stages, said first hydraulic fluid pressure and said second hydraulic fluid pressure being alternatively selected to be supplied, comprising a governor hydraulic fluid pressure control valve which produces a governor hydraulic fluid pressure which is representative of vehicle speed and which increases with increasing vehicle speed;
   (e) a lock up clutch control valve which has a first switched position and a second switched position, which when in its said first switched position switches said first hydraulic fluid channel so as to supply thereto a supply of said torque converter hydraulic fluid pressure and switches said second hydraulic fluid channel so as to release hydraulic fluid therefrom, and which when in its said second switched position switches said second hydraulic fluid channel so as to supply thereto a supply of said torque converter hydraulic fluid pressure and switches said first hydraulic fluid channel so as to release hydraulic fluid therefrom; said lock up clutch control valve being switched to its said first switched position by supply of a control hydraulic fluid pressure thereto, and being otherwise switched to its said second switched position; and (f) a lock up clutch interrupt valve which comprises a valve element shiftable between a first switched position and a second switched position, and a spring for biasing said valve element toward its said second switched position, which when said valve element is in its first switched position switches a supply of said first hydraulic fluid pressure so as to supply said first hydraulic fluid pressure to said lock up clutch control valve as said control hydraulic fluid pressure, and which when said valve element is in its said second switched position does not switch said supply of said first hydraulic fluid pressure so as to supply said first hydraulic fluid pressure to said lock up clutch control valve as said control hydraulic fluid pressure, so that said lock up clutch control valve in this case is not supplied with any such control hydraulic fluid pressure; said lock up clutch interrupt valve being supplied with said second hydraulic fluid pressure, when it is present, and said governor hydraulic fluid pressure by said hydraulic fluid pressure control system; said second hydraulic fluid pressure and said governor hydraulic fluid pressure being applied in opposite directions against said valve element of said lock up clutch interrupt valve, and, when said lock up clutch interrupt valve is not supplied with said second hydraulic fluid pressure, said valve element of said lock up clutch interrupt valve being switched between its said first switched position and its said second switched position by the balance of said governor hydraulic fluid pressure and the spring force of said spring so as to be switched to its said second switched position when the pressure value of said governor hydraulic fluid pressure is less than a critical pressure value, and being switched to its said first switched position when the pressure value of said governor hydraulic fluid pressure is greater than said critical pressure value, and when said lock up clutch interrupt valve is supplied with said second hydraulic fluid pressure, said valve element of said lock up clutch interrupt valve being switched to said second switched position irrespective of the value of said governor hydraulic fluid pressure.

2. A transmission system according to claim 1, wherein said highest speed stage is an overdrive stage and said next to highest speed stage is a direct connection stage.

* * * * *